(12) United States Patent
Hasegawa et al.

(10) Patent No.: US 6,952,647 B2
(45) Date of Patent: *Oct. 4, 2005

(54) ROUTE GUIDANCE APPARATUS AND METHOD

(75) Inventors: Tamotsu Hasegawa, Tokyo (JP); Mieko Matsuda, Kanagawa-ken (JP); Hiroaki Kubota, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/922,947

(22) Filed: Aug. 23, 2004

(65) Prior Publication Data

US 2005/0021230 A1 Jan. 27, 2005

Related U.S. Application Data

(63) Continuation of application No. 10/615,919, filed on Jul. 10, 2003, which is a continuation of application No. 10/083,538, filed on Feb. 27, 2002, now Pat. No. 6,622,089.

(30) Foreign Application Priority Data

Feb. 28, 2001 (JP) ........................................ 2001-055847

(51) Int. Cl.⁷ .............................................. G01C 21/00
(52) U.S. Cl. ...................................... 701/209; 701/211
(58) Field of Search ................................ 701/200, 202, 701/208, 209, 211; 340/995.1

(56) References Cited

U.S. PATENT DOCUMENTS

| | | | |
|---|---|---|---|
| 4,570,227 A | 2/1986 | Tachi et al. | |
| 6,119,065 A | 9/2000 | Shimada et al. | |
| 6,339,746 B1 | 1/2002 | Sugiyama et al. | |
| 6,526,350 B2 | 2/2003 | Sekiyama | |
| 6,622,089 B2 * | 9/2003 | Hasegawa et al. | 701/211 |
| 2001/0007968 A1 | 7/2001 | Shimazu | |

FOREIGN PATENT DOCUMENTS

| | | |
|---|---|---|
| JP | 03-48248 | 6/2000 |
| WO | WO 80/02209 | 10/1980 |

OTHER PUBLICATIONS

U.S. Appl. No. 09/716,303, filed Nov. 21, 2000, Hasegawa et al.

(Continued)

*Primary Examiner*—Yonel Beaulieu
(74) *Attorney, Agent, or Firm*—Finnegan, Henderson, Farabow, Garrett & Dunner, L.L.P.

(57) ABSTRACT

A database stores map data including road network data and landmark data. A route search unit searches for a route from a departure point to a destination point from the road network data stored in the database. A road pattern analysis unit analyzes a route pattern of the route by referring to the road network data, and obtains road pattern data as the analysis result. A landmark selection area decision unit determines a landmark selection area for route guidance along the route based on the road network data and the road pattern data. A landmark selection unit selects landmark data included in the landmark selection area from said database. A route guidance information generation unit generates route guidance information of the route using the road pattern data and the landmark data selected by the landmark selection unit. A presentation unit presents the route guidance information.

4 Claims, 14 Drawing Sheets

OTHER PUBLICATIONS

T. Hasegawa et al., "Text Generating Method for Interactive Route Guidance Service for Pedestrian", Technical Report of IEICE, HIP2001–13, pp. 43–48, (Jul. 2001).

H. Kubota, et al., "A Route Guide Text Generation Using Crossing Pattern Analysis for a Pedestrain Navigation", 63rd National Convention of IPSJ, 3J7, (Mar. 2001).

H. Kubota, et al., "Route Guidance Generating Methods for Cellular Phone", 12th Annual Symposium on Information System of Vector Graphics, IEICE, pp. 53–58, (May 2001).

M. Horie et al., "Interactive Generation of a Route and its Application to Generating a Sketch Map Drawing in a Map Image Information System", Technical Report of IEICE, pp. 31–38, (Feb. 1996).

T. Kimura, et al., "Modeling of Geographic Road Structure for Generation of Sketch Map Image and Linguistic Guide", Technical Report of IEICE, pp. 113–120, (Jan. 1997).

* cited by examiner

| ID | NUMERICAL |
|---|---|
| POSITION | (X, Y) |
| NAME | CHARACTER SEQUENCE |
| THE NUMBER OF ARKS TO BE CONNECTED | NUMERICAL VALUE |
| ARRANGEMENT OF ARK ID TO BE CONNECTED | ARRANGEMENT OF NUMERICAL VALUE |

FIG.4A

| ID | NUMERICAL VALUE |
|---|---|
| POSITION OF STARTING POINT | $(X_0, Y_0)$ |
| POSITION OF END POINT | $(X_1, Y_1)$ |
| NAME | CHARACTER SEQUENCE |
| ROAD WIDTH | NUMERICAL VALUE |

FIG.4B

| NUMBER | ROAD | | EXPRESSION OF ROUTE GUIDANCE | ANGLE (°) OF EACH ROAD | | |
| --- | --- | --- | --- | --- | --- | --- |
| | | | | ANGLE DIFFERENCE FOR ENTERING DIRECTION | | |
| | PATTERN | | | $\theta_0$ | $\theta_1$ | $\theta_2$ |
| 2 | NON-JUNCTION | | FOLLOW A ROAD | 0~45 | | |
| | | | RIGHT-TURN | 45~135 | | |
| | | | LEFT-TURN | 225~135 | | |
| | | | T-CROSSING or THE END | 70~110 | 250~290 | |
| 3 | JUNCTION (FORKED ROAD) | | Y-CROSSING | 30~70 | 290~330 | |
| | | | GO STRAIGHT, CROSS THE ROAD | 340~360 0~20 | 70~110 | 250~290 |
| 4 | JUNCTION (THREE-FORKED ROAD) | | TURN TO THE RIGHT AT THE JUNCTION | 70~110 | 340~360 0~20 | 250~290 |
| | | | TURN TO THE LEFT AT THE JUNCTION | 250~290 | 70~110 | 340~360 0~20 |

($\theta_0, \theta_1, \theta_2$ : ANGLE DIFFERENCE BETWEEN AN EXTENSION OF ENTERING ROAD AND EACH ROAD IN A CLOCKWISE DIRECTION)

FIG.8

| ID | NUMERICAL VALUE |
|---|---|
| NAME | CHARACTER SEQUENCE |
| CLASS | NUMERICAL VALUE |
| PRIORITY DEGREE | NUMERICAL VALUE |
| POSITION | (X, Y)( LATITUDE, LONGITUDE) |

FIG.12

- ▼ GO OUT KAWASAKI STATION , AND GO FORWARD TO YOKOHAMA BANK BY 50 METERS.

- ▼ GO FORWARD TO THE SOUTH ALONG THE STREET IN FRONT OF YOKOHAMA BANK BY 200 METERS.

- ▼ TURN TO THE LEFT AT T-CROSSING , GO FORWARD BY 20 METERS, AND GO FORWARD ALONG A CRANK BY FOLLOWING THE ROAD.

- ▼ TURN TO THE LEFT AT Y-CROSSING .

FIG.14A

- ▼ GO OUT KAWASAKI STATION , AND GO FORWARD TO YOKOHAMA BANK BY 50 METERS.

- ▼ GO FORWARD TO THE SOUTH ALONG THE STREET IN FRONT OF YOKOHAMA BANK BY 200 METERS.

- ▼ TURN TO THE LEFT AT A JUNCTION, GO FORWARD BY 20 METERS, TURN TO THE RIGHT, GO FORWARD BY 10 METERS, AND GO FORWARD TO THE LEFT BY 30 METERS.

- ▼ GO FORWARD TO THE LEFT AT A JUNCTION .

FIG.14B

ROUTE GUIDANCE APPARATUS AND METHOD

CROSS-REFERENCE TO RELATED APPLICATIONS

This is a continuation of application Ser. No. 10/615,919, filed Jul. 10, 2003, which is a continuation of application Ser. No. 10/083,538, filed Feb. 27, 2002 (now issued U.S. Pat. No. 6,622,089 B2), and claims the benefit of Japanese Application No. 2001-055847, filed Feb. 28, 2001, all of which are incorporated herein by reference.

FIELD OF THE INVENTION

The present invention relates to a route guidance apparatus and a method for executing route guidance for a pedestrian by presenting a route guidance sentence or a simplified map.

BACKGROUND OF THE INVENTION

Recently, a route guidance apparatus for presenting a route guidance sentence and a simplified map to a destination for a pedestrian is developed. This route guidance apparatus is a simple portable device or is loaded to a portable communication terminal such as a cellular-phone or a personal data assistant (PDA).

A route guidance technique using the route guidance sentence and the simplified map is disclosed in the following two references.

(1) TECHNICAL REPORT OF IEICE, PRU95-215 (1996-02), "Interactive Generation of a Route and Its Application to Generating a Sketch Map Drawing in a Map Image Information System" Masahiko HORIE, Toshihiro KIMURA, Noboru BABAGUCHI, Seiichiro DAN and Tadahiro KITAHASHI (2) TECHNICAL REPORT OF IEICE, PRMU96-156 (1997-01), "Modeling of Geographic Road Structure for Generation of Sketch Map Image and Linguistic Guide" Toshihiro KIMURA, Yoshihiro SUZUKI, Seiichiro DAN, Noboru BABAGUCHI and Tadahiro KITAHASHI As for generation of the route guidance sentence, in reference (1), for example, a sentence "Please go forward to the west direction by 20 meters." or "Please turn to the right at the junction.", can be presented. However, especially, numerical value representing distance such as "** meters" is difficult for a pedestrian to apply. Furthermore, innumerable junctions exist in a town area, and the pedestrian often mistakes a junction indicated by the route guidance sentence for another junction. Accordingly, such route guidance sentence is not always easy for the pedestrian to sufficiently understand.

In reference (2), for example, a route guidance sentence such as "This road joins another road." or "You advance to ** at a crossroads.", is only presented. This route guidance sentence is more difficult for the pedestrian to understand than the route guidance sentence disclosed in the reference (1).

Furthermore, in the reference (2), generation of a simplified map for guidance using a signpost for pedestrian (i.e., a landmark) is disclosed. However, generation of a route guidance sentence using the landmark is not disclosed in the references (1) or (2). In the reference (2), the target object is reserved. As for other landmarks, the landmark far from a main junction is removed in order to simply present the landmark. However, if this method is used for generation of the route guidance sentence, for example, a complicated route guidance sentence using many landmarks is generated at a place neighboring the main junction. Thus, easiness of the route guidance produces a contrary effect.

As mentioned-above, in the known route guidance technique, presentation of the route guidance sentence is not always easy for the pedestrian to understand, and it often happens that the pedestrian misunderstands a junction point, a joint point, or a divergence point indicated by the route guidance sentence.

Furthermore, a method for effectively utilizing landmarks for generation of the route guidance sentence is not found. In short, it is impossible to execute easy route guidance for the pedestrian by using landmarks.

SUMMARY OF THE INVENTION

It is an object of the present invention to provide a route guidance apparatus and a method to present route guidance easy for the pedestrian to understand.

According to the present invention, there is provided a pedestrian route guidance apparatus, comprising: a database configured to store map data including road network data and landmark data; a route search unit configured to search for a route from a departure point to a destination point from the road network data stored in said database; a road pattern analysis unit configured to analyze a route pattern of the route by referring to the road network data, and to obtain road pattern data as the analysis result; a landmark selection area decision unit configured to determine a landmark selection area for route guidance along the route based on the road network data and the road pattern data; a landmark selection unit configured to select landmark data included in the landmark selection area from said database; a route guidance information generation unit configured to generate route guidance information of the route using the road pattern data and the landmark data selected by said landmark selection unit; and a presentation unit configured to present the route guidance information.

Further in accordance with the present invention, there is also provided a pedestrian route guidance method, comprising: storing map data including road network data and landmark data in a database; searching for a route from a departure point to a destination point from the road network data stored in the database; analyzing a route pattern of the route by referring to the road network data; obtaining road pattern data as the analysis result; determining a landmark selection area for route guidance along the route based on the road network data and the road pattern data; selecting landmark data included in the landmark selection area from the database; generating route guidance information of the route using the road pattern data and the selected landmark data; and presenting the route guidance information.

Further in accordance with the present invention, there is also provided a computer program product, comprising: a computer readable program code embodied in said product for causing a computer to execute pedestrian route guidance, said computer readable program code having: a first program code to store map data including road network data and landmark data in a database; a second program code to search for a route from a departure point to a destination point from the road network data stored in the database; a third program code to analyze a route pattern of the route by referring to the road network data; a fourth program code to obtain road pattern data as the analysis result; a fifth program code to determine a landmark selection area for route guidance along the route based on the road network data and the road pattern data; a sixth program code to select landmark data included in the landmark selection area from the database; a seventh program code to generate route guidance information of the route using the road pattern data and the selected landmark data; and a eighth program code to present the route guidance information.

BRIEF DESCRIPTION OF THE DRAWINGS

FIGS. 4A and 4B are schematic diagrams of component example of node data and arc data.

FIG. 8 is a schematic diagram of one example of a decision dictionary to decide a road pattern and an expression of route guidance.

FIG. 12 is a schematic diagram of a component example of landmark data.

FIGS. 14A and 14B are schematic diagrams of a comparison example of the route guidance sentence according to the one embodiment and the prior art.

DETAILED DESCRIPTION OF THE EMBODIMENTS

Figure 1:
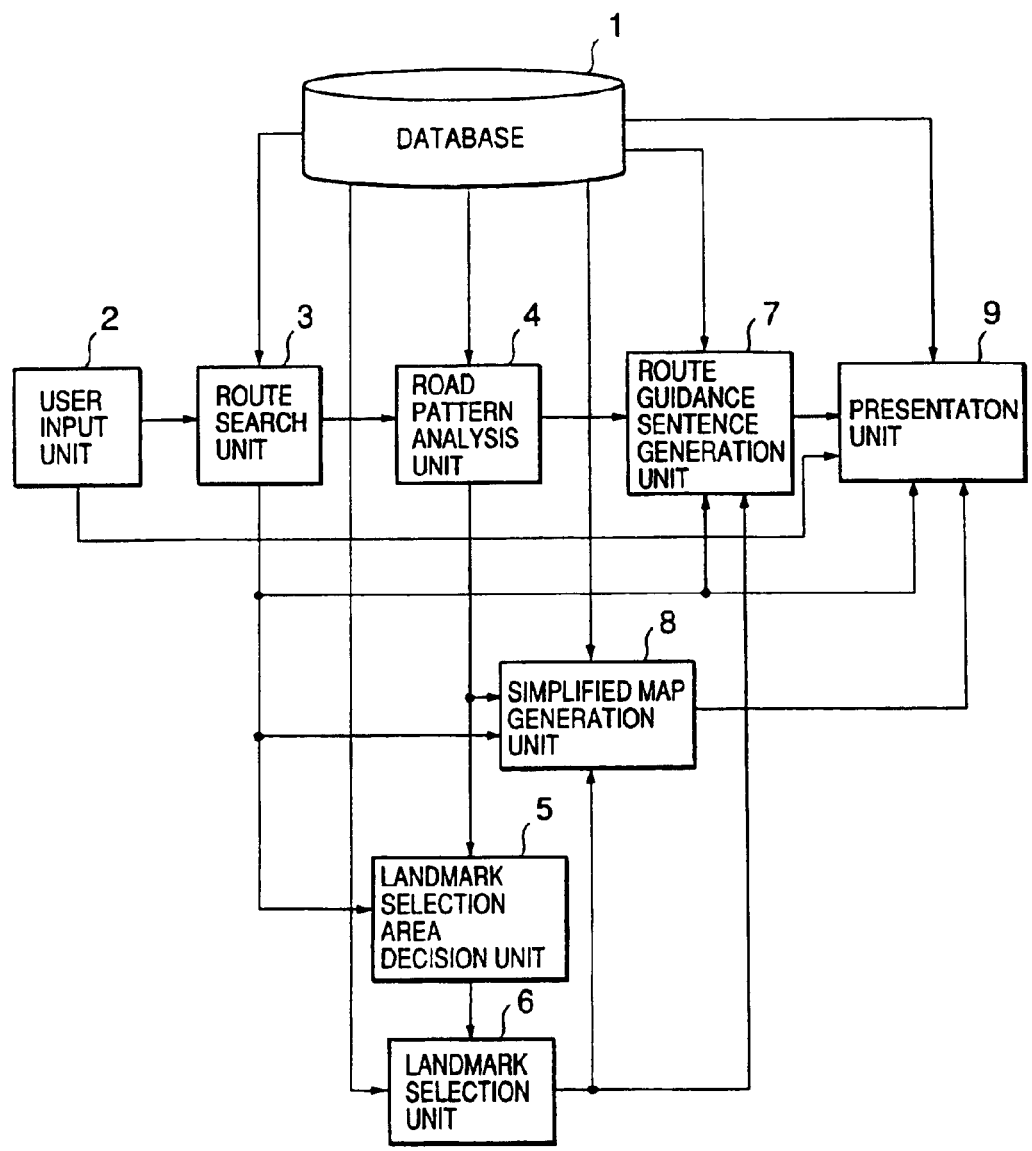
FIG. 1 is a block diagram of the route guidance apparatus according to one embodiment of the present invention.

Hereinafter, various embodiments of the present invention will be explained by referring to the drawings. FIG. 1 is a block diagram of a pedestrian route guidance apparatus according to one embodiment of the present invention. The pedestrian guidance apparatus and method are preferably optimized for the relative slow speed of a pedestrian, as opposed to a motor vehicle, as well as for the free movement of a pedestrian unrestrained by motor vehicle restrictions such as turn lanes and one-way roads. Thus "pedestrian" is not strictly limited to a person who travels by foot, but also applies to similar transportation modes such as skate boards, scooters, wheelchairs, in-line skates, and even bicycles.

In a database 1, basic data to generate a route guidance sentence and a simplified map along a route, such as map data, a route guidance sentence database used for generation of the route guidance sentence, and a simplified map database are stored. In the map data, in addition to map image, road network data and landmark data are included. In the route guidance sentence database and the simplified map database, a plurality of presentation patterns corresponding to each road pattern are included. Furthermore, in the simplified map database, the presentation is stored as bit map data or vector data.

The database 1 may be set in the route guidance apparatus. However, if function of the route guidance apparatus is packaged in a portable communication terminal such as a cellular-phone, or if the route guidance apparatus is composed as a dedicated portable device, the database 1 is set outside the route guidance apparatus and connected to the route guidance apparatus by wireless communication line. Furthermore, in the database 1 the map data and the landmark data may be an outside database set outside the route guidance apparatus, and the route guidance sentence database and the simplified map database may be an inside database set in the route guidance apparatus.

A user input unit 2 is used for various kinds of input operation such as key operation or dial operation by a user using the route guidance apparatus (i.e., a pedestrian). When the user inputs location information of a departure place and a destination through the input unit 2, road network data is read from the database 1 based on the location information, and supplied to a route search unit 3.

The route search unit 3 searches for a route from the departure place to the destination using the location information input by the user input unit 2 and the road network data read from the database 1, and generates route data represented by vector data.

A road pattern analysis unit 4 analyzes a road pattern of the route (pattern analysis) by referring to the road network data corresponding to the route data in the database 1. In this case, the road pattern is a pattern of road included in the route and neighboring area of the route, which is explained in detail afterward. For example, the road pattern includes type (road attribute) representing whether the road is a straight route, whether the road is a junction point or a corner (crank, S curve), or whether the road is a station rotary. In addition to this, if the road is a junction point or a corner, the road pattern represents detail pattern. An analysis method of the road pattern is explained below.

The landmark selection area decision unit 5 determines a landmark selection area necessary for route guidance along the route represented by the route data from the route search unit 3 and the road pattern data from the road pattern analysis unit 4.

The landmark selection unit 6 selectively reads out landmark data corresponding to the landmark selection area selected by the landmark selection area decision unit 5 from the database 1.

In a route guidance sentence generation unit 7 and a simplified map generation unit 8, by using the route pattern data from the road pattern analysis unit 4, the landmark data selected by the landmark selection unit 6 corresponding to the road pattern data from the database 1, and the route guidance sentence database and the simplified map database from the database 1, the route guidance sentence and the simplified map are generated as route guidance information to guide a user along the route data from the route search unit 3.

A presentation unit 9 is, for example, a display or a speaker. In the presentation unit 9, based on the route guidance sentence data from the route guidance sentence generation unit 7, a route guidance sentence is presented by character sequence or speech. Furthermore, based on the simplified map data from the simplified map generation unit 8, a simplified map along a route from the departure place to the destination is displayed as an image. In this way, the route guidance sentence and the simplified map are presented to the user.

In the above-mentioned component element in the route guidance apparatus in FIG. 1, a part of the database 1, the route search unit 3, the road pattern analysis unit 4, the landmark selection area decision unit 5, the landmark selection unit 6, the route guidance sentence generation unit 7, and the simplified map generation unit 8 can be realized as software processing by a computer such as a route guidance apparatus terminal or a portable communication terminal.

Figure 2:
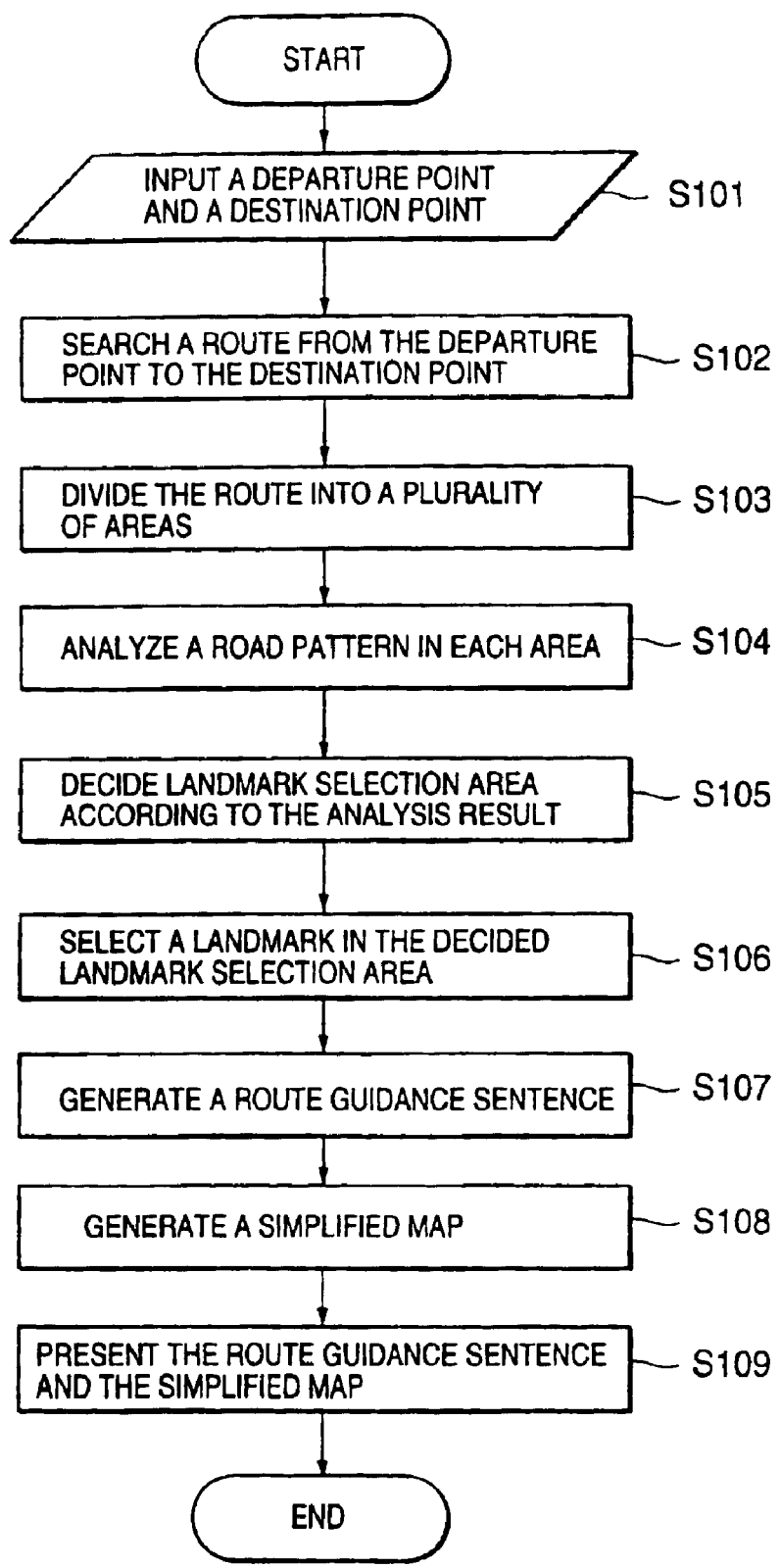
FIG. 2 is a flow chart of route guidance processing according to one embodiment of the present invention.

Next, by following a flow chart shown in FIG. 2, the route guidance processing of the present embodiment is explained. First, the user input unit 2 is operated by a user who desires the route guidance, and a departure point and a destination point are input (S101). As this input operation, in a condition that a map of place including a departure place and a destination is displayed based on the map data from the database 1 on a screen of the route guidance apparatus (a display of the presentation unit 9), the user may indicate the departure point and the destination point on the map by using a mouse, a cursor, a pen, or a key. Furthermore, the user may select the departure point and the destination point from a list including landmarks, addresses and names.

Next, based on the departure point and the destination point input by the user, and a route search condition, the route search unit 3 searches a route from the departure point to the destination point (S102). As a route search method, a route including a sidewalk may be preferably selected. Furthermore, Dijkstra's method well known as an algorithm to find the shortest route may be used. Of course, other methods of route search can be used. Briefly, it is sufficient that some route connected from the departure place to the destination can be determined. Otherwise, the user may directly input the route on the map.

Figure 3:
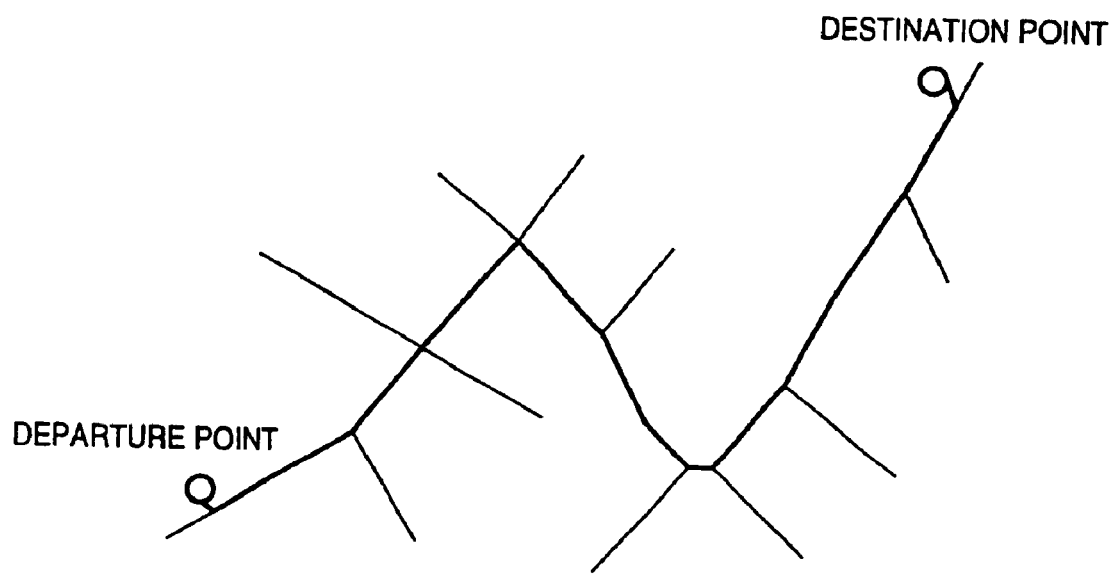
FIG. 3 is a schematic diagram of one example of a route to be searched.

As a result of the route search, as shown in FIG. 3, route data from the departure point to the destination point represented by node and arc are obtained. For example, the node is represented as node data shown in FIG. 4A and the arc is represented as arc data shown in FIG. 4B. The node is a divergence point on the road network, for example, the node exists in a junction point and a corner. The arc is a line segment connecting two nodes. If a plurality of arcs is connected to one node, the plurality of arcs can be extracted by referring to connection from the node. Furthermore, by tracing from arc to node and from node to arc in order, a series of route lines can be traced.

Figure 5:
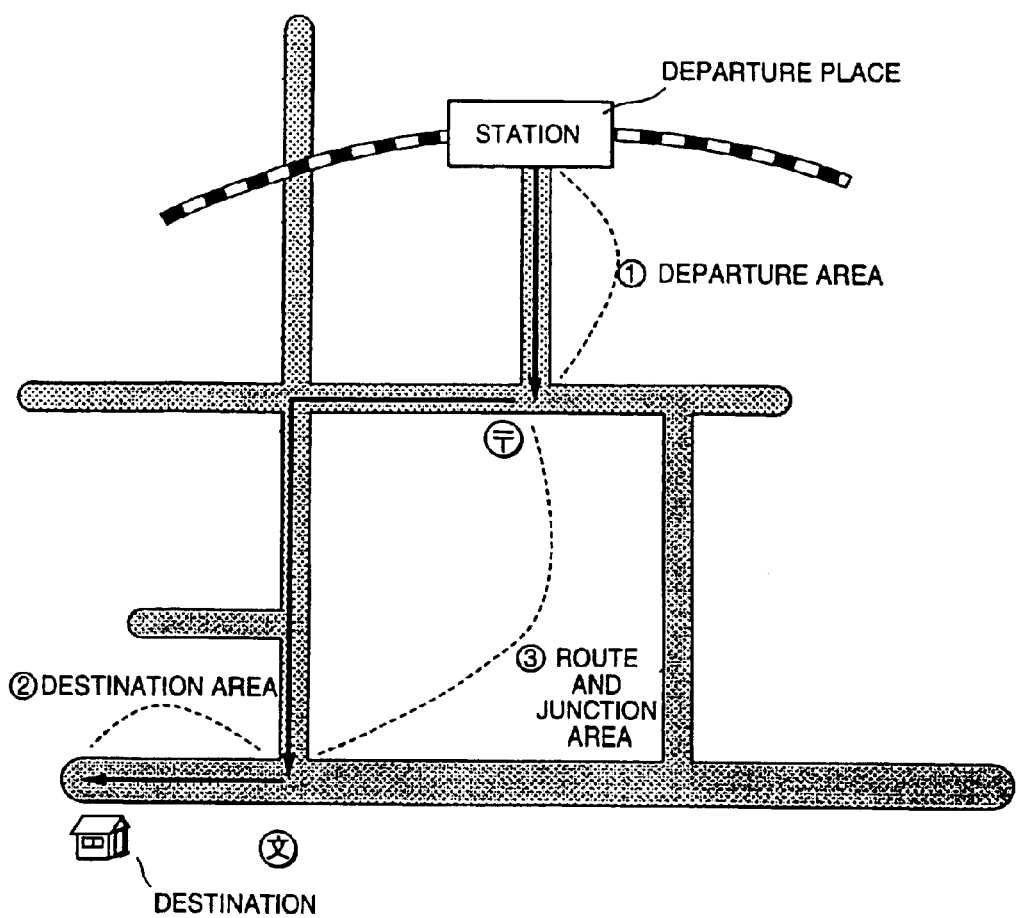
FIG. 5 is a schematic diagram of one example of divided route.

Next, in the present embodiment, as shown in FIG. 5, the route search unit 3 divides the route searched at S102 into at least three areas, i.e., a departure area, a destination area, and an intermediate area (route and junction area) (S103). Briefly, the route is divided into three class parts and used for generation of the route guidance sentence and presentation of the simplified map. By referring to FIG. 5, one example of route division processing is explained.

The departure area is an area from the departure place input by the user to the first target object. In FIG. 5, the departure place is a station. When the user walks from the station to the destination, a target object first watched by the user is a post office. The departure area is thus the area from the station to the post office. The departure area is important for a pedestrian to decide a direction to begin walking. The departure area does not always include a road. Accordingly, special explanation is sometimes necessary for the route guidance sentence or the simplified map.

The destination area is an area from the last target object to the destination input by the user. In FIG. 5, the object last appearing along the route is a school. The destination area is thus the area from the school to the destination. The road network is not always divided at a place of a pedestrian's target. Accordingly, special explanation is sometimes necessary for the map, the route guidance sentence, or the simplified map from the last target object to the destination.

In addition to the example post office and school, the target object may be a signpost building such as a bank, a cinema theater, an eating house, a supermarket and a convenience store, a signal, a junction name, a road name, road pattern such as a T-crossing or a junction, attendant object to the road such as a pedestrian bridge and a marked crosswalk. In short, the target object is all object usable as the signpost for the pedestrian's walking. The route search unit 3 obtains information of the target object by referring to the road network data and the landmark data in the database 1. Furthermore, the route and junction area is a road included in intermediate route except for the departure place and the destination. The route and junction area includes a junction, a corner, and so on. In the present embodiment, the road pattern analysis is mainly executed for the route and junction area.

Next, the road pattern analysis unit 4 analyzes a road pattern of the route searched at S102 (S104). If route division processing of S103 is executed after route search of S102, as mentioned-above, the road pattern of the route and junction area is analyzed at S104. The road pattern is mainly a pattern of intersection. The road pattern analysis represents which forked road the junction is, which degree the angle difference between a direction of entering road and a direction of escape road, whether the road crosses a wide road at the junction, whether the road crosses an overpass. In short, a usable road pattern to be analyzed based on the road network data is analyzed.

Next, based on the route data obtained at S102~S103 and the road pattern data obtained at S104, the landmark selection area decision unit 5 determines the landmark selection area to select the landmark along a route represented by the route data (S105)

Next, the landmark selection unit 6 selectively reads out the landmark data from the database 1 in correspondence with the landmark selection area selected at S105 by the landmark selection area decision unit 5 (S106).

Next, by referring to the road pattern data obtained at S104, the landmark data selected from the database 1 at S106, and the route guidance sentence database stored in the database 1, the route guidance sentence generation unit 7 generates a route guidance sentence including an explanation of the road pattern and landmark names to guide a user along the route determined at S102 (S107).

Furthermore, by referring to the road pattern data obtained at S102, the landmark data selected from the database 1 at S106, and the simplified map database stored in the database 1, the simplified map generation unit 8 generates a simplified map (S108).

Then, the presentation unit 9 presents the route guidance sentence generated at S107 by display of character sequence or speech. Furthermore, the presentation unit 9 presents the simplified map generated at S108 by image display (S109).

Figure 6A:
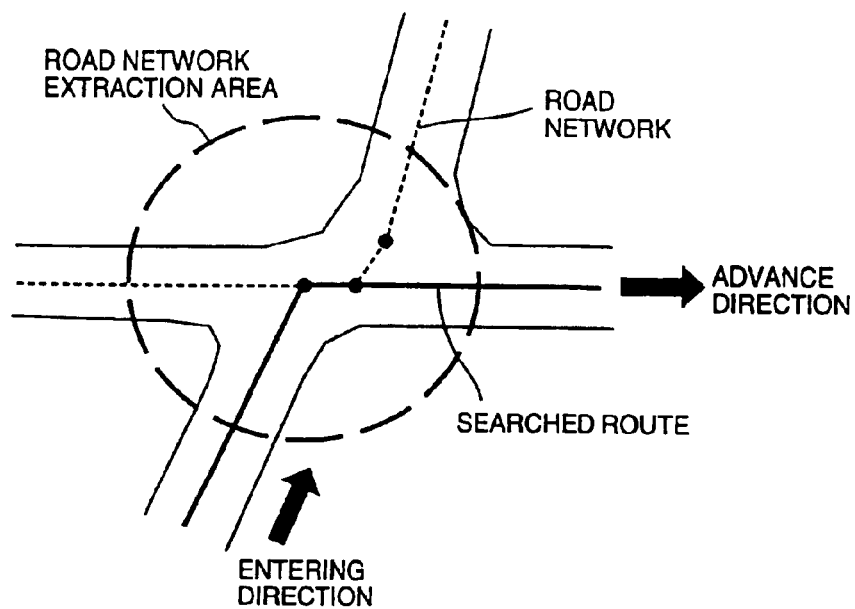
FIGS. 6A and 6B are schematic diagrams of road network data neighboring a junction point and analysis result of junction pattern.
Figure 6B:
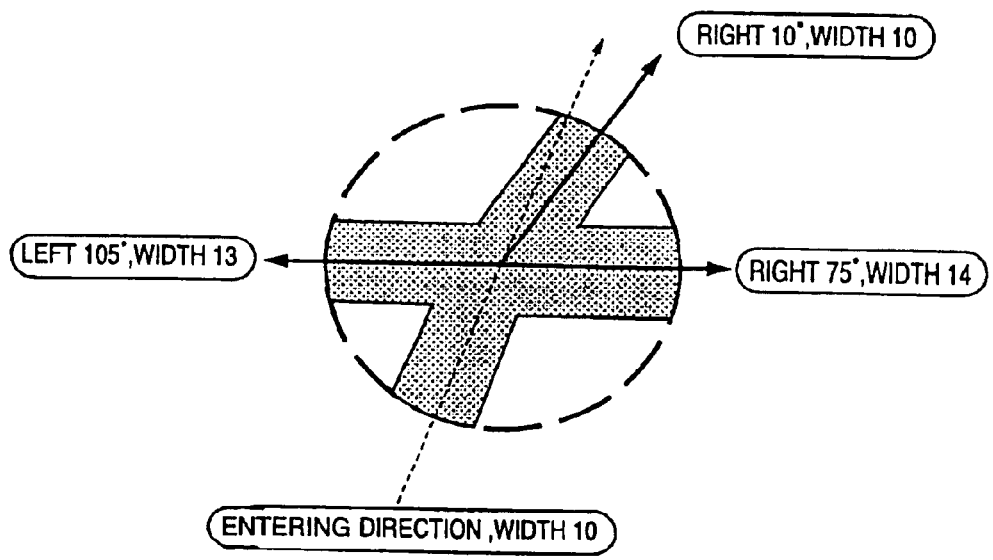

Hereinafter, processing of each step in FIG. 2 is explained in detail. First, as a concrete example of analysis processing at S104 by the road pattern analysis unit 4, analysis processing of junction pattern is explained. The road pattern analysis unit 4 extracts road network data of the route searched by the route search unit 3 from the database 1. For example, as shown in FIG. 6A, the road pattern analysis unit 4 sets a mask having a size several times the road width of advance direction on road network area and having a center point at the junction, and extracts the road network data included in the mask from the database 1. Next, the road pattern analysis unit 4 analyzes the road network area in the area extracted by the mask (road network extraction area). As shown in FIG. 6B, the road pattern analysis unit 4 measures the number n (In FIG. 6B, n=4) of route lines each extended from the junction to outside of the road network extraction area, a direction of each route line (angle difference between entering direction and a direction of each route), and a width of each route. By this road pattern analysis, the object junction is decided such as "three-forked road", "T-crossing and the end", "Y-crossing and forked road".

Figure 7:
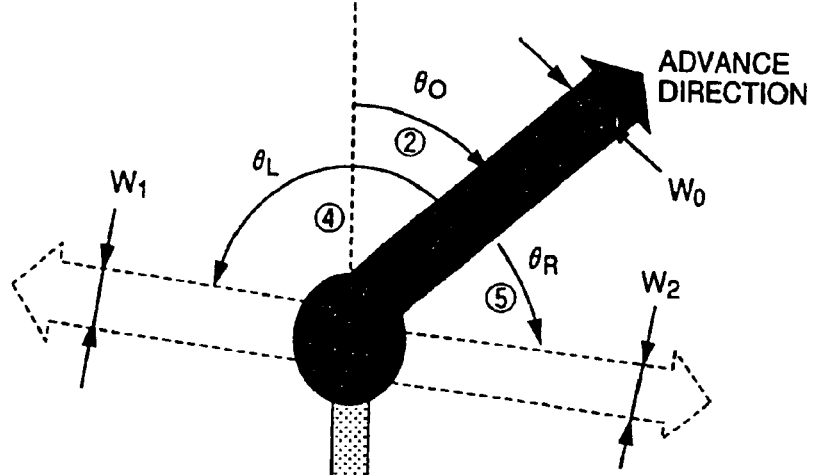
FIG. 7 is a schematic diagram of various parameters representing a junction pattern.

In case that the road pattern analysis unit 4 analyzes a junction pattern, the road pattern analysis unit 4 analyzes the road network data in the road network extraction area, and generates the following seven parameters of junction pattern as shown in FIG. 7.

(1) The number n of roads each connected from the junction (2) Angle difference $\theta_0$ between the entering direction and the advance direction for the junction in the clockwise direction (3) Angle difference $\theta_1$, $\theta_2$ between the entering direction and each direction of other roads except for the advance direction for the junction in the clockwise direction (4) Angle difference $\theta_L$ between the advance direction and a direction of another road connected from the junction in the counterclockwise direction (5) Angle difference $\theta_R$ between the advance direction and a direction of the other road connected from the junction in the clockwise direction (6) A ratio of road width "P=Wo/Wi" for the road width Wi of entering direction and the road width Wo of advance direction (7) A ratio of road width "Q=max(W1, W2, . . . )/max(Wi, Wo)" for other road width W1, W2, . . . .

In FIG. 7, the angle difference $\theta_1$, $\theta_2$ of above (3) is not shown.

For example, in case of the junction pattern shown in FIG. 6B, the following parameters except for $\theta_1$, $\theta_2$ are obtained.

$$C(n, \theta_O, \theta_L, \theta_R, P, Q) = \{4, 75, 105, 65, 100, 140\}$$

Next, the road pattern analysis unit 4 compares the above-mentioned parameters with a decision dictionary shown in FIG. 8 in order to decide the road pattern. In the decision dictionary shown in FIG. 8, the number of roads (Hereinafter, it is called connection road) connected to a notice point such as the junction or the corner (In case of the junction, the number is above-mentioned "n"), relation of angle difference between each connection road, road pattern including the junction pattern based on the pedestrian's advance direction, and expression of route guidance representing for the pedestrian how to advance along the road are correspondingly stored. In FIG. 8, "Angle of each road (Angle difference for entering direction)" is angle difference between the entering direction and a direction of each road except for the entering direction, and represented as "$\theta_0, \theta_1, \theta_2$". For example, if the number of connection roads is two (a road of entering direction and a road of advancing direction), the road pattern is a straight road or a corner. The expression of route guidance is one of "Follow a road", "Right-turn" and "Left-turn" based on angle of the advance direction. On the other hand, if the number of connection roads is three, the road pattern is the junction of forked road. If the number of connection roads is four, the road pattern is the junction of three-forked road. The forked road includes various cases, i.e., a case that each road diverges from the junction point at an interval of almost equal angle, a case that each road diverges at T-crossing (or the end), a case that each road diverges at Y-crossing, and a case that the advance direction is straight but a branch road exists on the way. The case to which the forked Road is decided by combination of the angle difference between the entering direction and each direction of other two connection roads. The expression of route guidance corresponding to the decided case is obtained. As for the three-forked road, based on combination of the angle difference between the entering direction and each direction of other three connection roads, the expression of route guidance is decided as one of "Go straight, and cross the road", "Turn to the right at the junction", "Turn to the left at the junction".

A threshold to decide the angle of each connection route is not limited to values shown in FIG. 8. The threshold may be experimentally determined by making inquiries. In short, some decision standard is determined and stored as a database. The road pattern may be analyzed based on this decision standard.

Figure 9A:
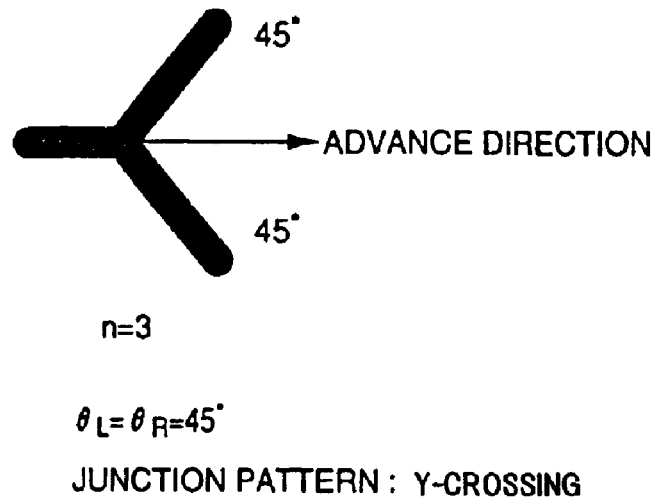
FIGS. 9A and 9B are schematic diagrams of analysis example of the junction pattern.
Figure 9B:
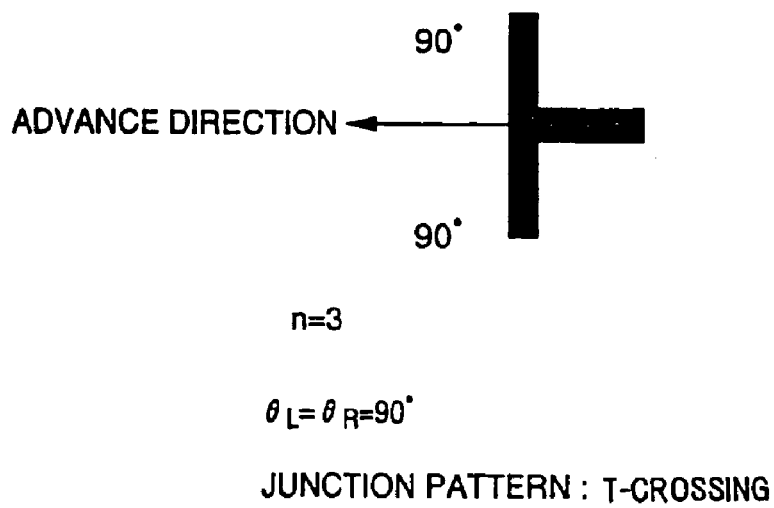

Furthermore, the decision of junction pattern can be executed by angle $\theta_L$, $\theta_R$, shown in FIG. 7. Concretely, suitable threshold is set to the angle $\theta_L$ and $\theta_R$, such as a limit "10°~80°" or a limit "80°~100°". For example, as shown in FIG. 9A, the junction pattern is decided as Y-crossing because of "n=3, $\theta_L = \theta_R = 45°$". In the same way, as shown in FIG. 9B, the junction pattern is decided as T-crossing because of "n=3, $\theta_L = \theta_R = 90°$". As for the junction, the road pattern analysis unit 4 outputs the above-mentioned junction pattern parameter and analysis result of the junction pattern as the road pattern data.

Figure 10:
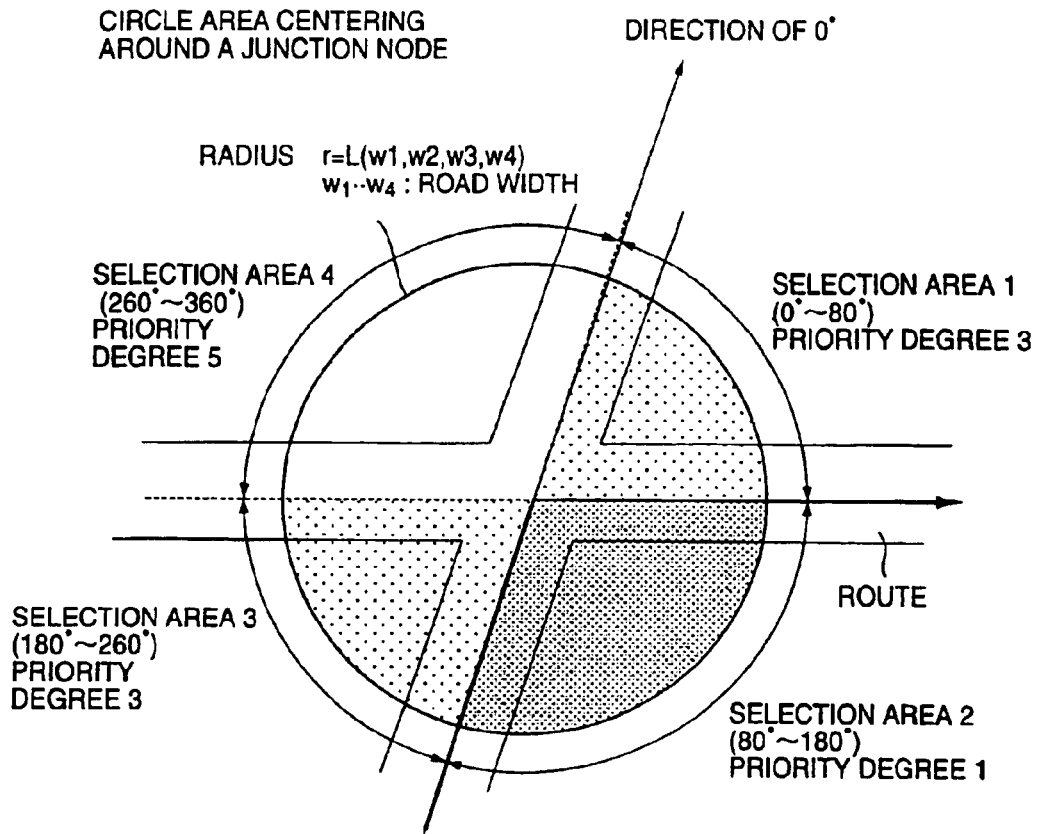
FIG. 10 is a schematic diagram of landmark selection area at a junction.

Next, referring to FIG. 10, the decision processing of landmark selection area at S105 by the landmark selection area decision unit 5 will be explained. The landmark selection area decision unit 5 determines a landmark selection area based on geometrical information including the route data from the route search unit 3 and the route pattern data from the road pattern analysis unit 4. FIG. 10 shows a decision example of the landmark selection area at the junction. As mentioned-above, the junction pattern is analyzed by the road pattern analysis unit 4 as the following junction pattern parameters.

$$C(n, \theta_0, \theta_L, \theta_R, P, Q) = \{4, 75, 105, 65, 100, 140\}$$

These parameters are called the geometrical information.

Next, a circle area of a radius "r" in which a junction point is the center is determined. The radius r is calculated by the following function including road widths W1, W2, W3, W4 of the roads forming the junction.

$$r = L(W1, W2, W3, W4)$$

Next, by using the analysis result of the junction pattern, the circle area is divided into four areas (selection areas 1, 2, 3 and 4 in FIG. 10), i.e., area cut by each road line connected to the junction point. To each selection area 1, 2, 3 and 4, a priority degree corresponding to the junction pattern parameter obtained by the road pattern analysis unit 4 is assigned. The priority degree is obtained by preparing a table (priority degree definition table) describing the priority degree of each area corresponding to the junction pattern parameter in the database 1. In this way, in the landmark selection area decision unit 5, the landmark selection area is determined based on geometrical information of the route data and the road pattern data.

Figure 11A:
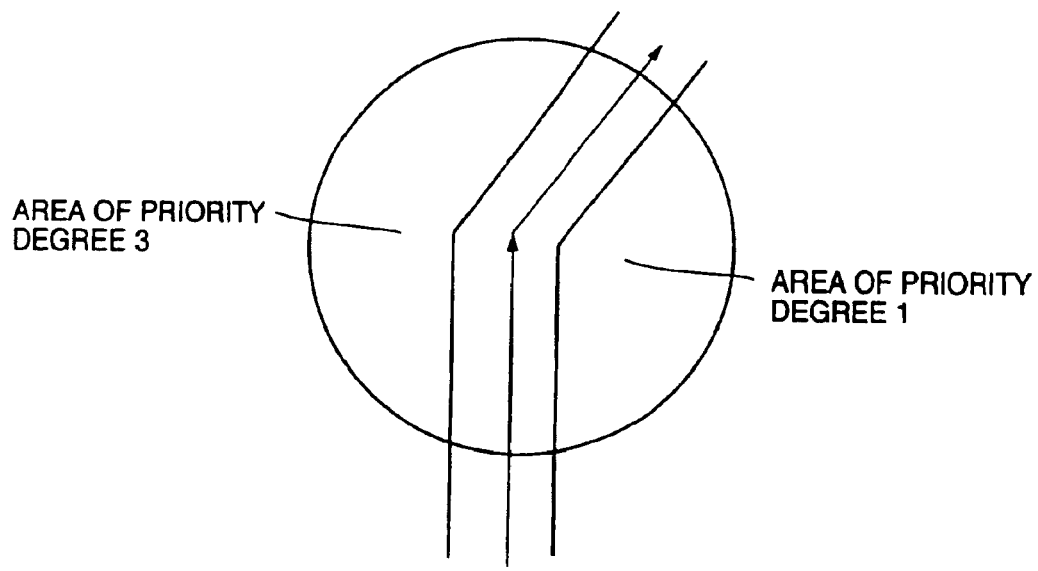
FIGS. 11A and 11B are schematic diagrams of a priority degree definition table for the landmark selection area.
Figure 11B:
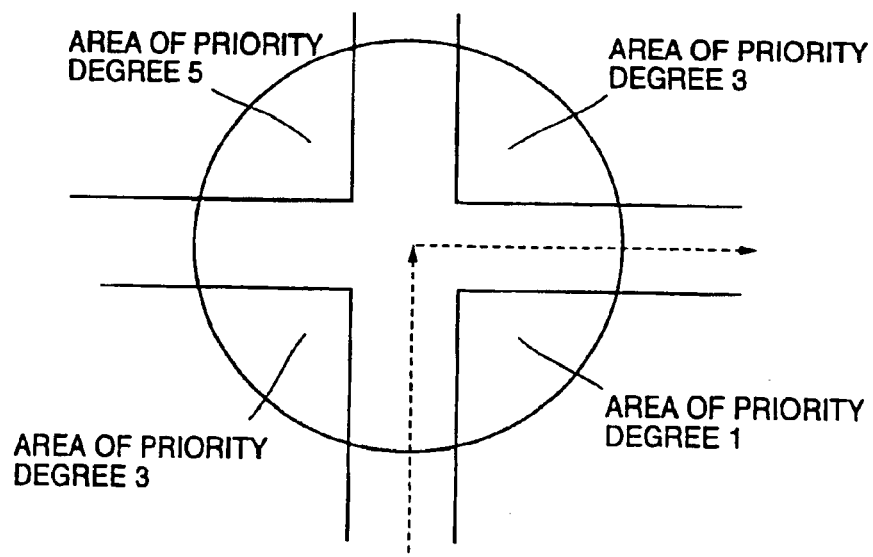

FIGS. 11A and 11B show examples of a priority degree definition table of the landmark selection area. FIG. 11A shows an example pattern in which an advance road turns to the right direction, and FIG. 11B shows an example pattern in which an advance road turns to the right at a three-forked intersection (crossroads). The higher the priority degree is, the smaller the numerical value is. In FIG. 11A, the priority degree of the right side area for the advance direction is high. In FIG. 11B, the priority degree of the lower right side area is the highest, the priority degree of the upper left side area is the lowest, and the priority degree of the lower left side area is the same as the priority degree of the upper right side area.

Next, landmark selection processing at S106 by the landmark selection unit 6 is explained. In the landmark selection unit 6, by using the landmark selection area determined by the landmark selection area decision unit 5, landmark data representing landmarks included in the landmark selection area are selectively obtained from the database 1.

In the database 1 in FIG. 1, the landmark data including items shown in FIG. 12 are stored for each landmark. In FIG. 12, "ID" is a numerical value representing identifier of the landmark. "Name" is a name of the landmark such as a shop name or an institution name. "Class" represents a type of the landmark such as a gas station or a bank. "Priority degree" is a numerical evaluation standard to decide whether the landmark is preferably used in case of route search or generation of a route guidance sentence. "Position" is an X, Y coordinate of the landmark (For example, the latitude and the longitude).

Figure 13A:
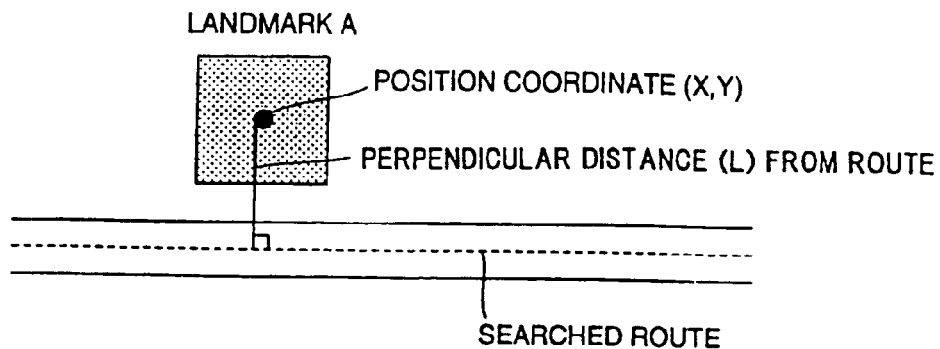
FIGS. 13A and 13B are schematic diagrams of landmark selection on the way of the route.

As for the landmark along the route, as shown in FIG. 13A, a landmark of which a distance d1 is smaller is preferably selected from each landmark in the landmark selection area. The distance d1 is calculated by the following function F1 including the priority degree (α) of the selection area, a perpendicular distance (L) from the route, and the priority degree (β) of the landmark.

$$d1 = F1(L, \alpha, \beta)$$

Figure 13B:
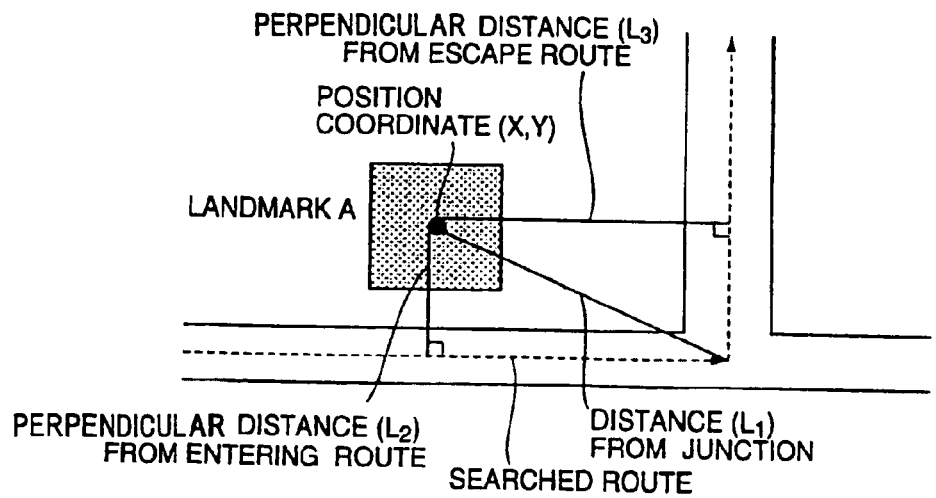

L: perpendicular distance from the route
α: priority degree of the selection area
β: priority degree of the landmark As for the landmark of junction part, as shown in FIG. 13B, a landmark having a shorter distance d2 is preferably selected from each landmark in the landmark selection area. The distance d2 is calculated by the following function F2 including the priority degree (α) of the selection area, a distance (L1) from the junction point, a perpendicular distance (L2) from entering route to the junction point, a perpendicular distance (L3) from escape route from the junction point, and the priority degree (β) of the landmark.

$$d2 = F2(L1, L2, L3, \alpha, \beta)$$

L1: distance from the junction point
L2: perpendicular distance from the entering route
L3: perpendicular distance from the escape route
α: priority degree of the selection area
β: priority degree of the landmark Examples of the functions F1 and F2 are represented as follows.

$$d1 = F1(L, \alpha, \beta) = \alpha * \beta * L$$

$$d2 = F2(L1, L2, L3, \alpha, \beta)$$
$$= \alpha * \beta * (A * L1 + B * L2 + C * L3) \quad (A, B, C: \text{constant})$$

Next, generation processing of the route guidance sentence at S107 by the route guidance sentence generation unit 7 is explained. In the route guidance sentence generation unit 7, each unit guidance sentence is generated using the route data obtained by the route search unit 3, the road pattern data obtained by the road pattern analysis unit 4, and the landmark data selected by the landmark selection unit 6. The unit guidance sentence is a minimum sentence for executing route guidance to the pedestrian. For example, (1) a sentence to guide from the departure place to the first target object, (2) a sentence to guide from a target object to the next target object, (3) a sentence to guide from a corner to the next target object, (4) a sentence to guide from the last target object to the destination, are regarded as the unit guidance sentence. The unit guidance sentence can be generated using a distance between two nodes, the landmark neighboring the node, the junction pattern, and the corner state. Especially, if the target object is the junction, the road pattern analysis unit 4 decides whether the junction pattern is a forked road (T-type, Y-type) or a three-forked road, and how to advance the three-forked road by referring to the decision dictionary shown in FIG. 8. Accordingly, an easy sentence using the junction pattern is generated.

In order to generate the unit guidance sentence, an expression model corresponding to the road pattern data generated by the road pattern analysis unit 4 is selected from the database 1. For example, assume that the analyzed road pattern is the junction pattern represented by the following parameter shown in FIG. 7.

$$C(n, \theta_0, \theta_L, \theta_R, P, Q) = \{4, 75, 105, 65, 100, 140\}$$

In the database 1, following four expression models corresponding to above parameters are registered.

① TURN TO <TURN> AT <CROSS>.
② TURN TO <TURN> AT THE CORNER OF <MARK>.
③ TURN TO <TURN> AT THIS SIDE OF <MARK>.
④ TURN TO <TURN> AT A CROSSROADS DISTANT BY <DIST> METER FROM <MARK>.

In the above expression models, a junction name is assigned to <CROSS>, a landmark name is assigned to <MARK>, turn direction (the left or the right) is assigned to <TURN>, and a distance to the junction is assigned to <DIST>.

In this case, the expression model represents the expression of route guidance corresponding to each road pattern in the decision dictionary shown in FIG. 8.

Next, the landmark name of landmark selected by the landmark selection unit 6, the junction name, and the distance from the junction are assigned to each unit guidance sentence. Each unit guidance sentence generated is combined along the route obtained by the route search unit 3. As a result, route guidance which represents the route from the departure place to the destination as a series of sentences is generated.

FIGS. 14A and 14B show comparison examples of the route guidance sentence according to the present embodiment and the prior art. In FIG. 14A, a part of underlines is special guidance sentence of the present embodiment, which is not included in FIG. 14B of the prior art. In short, in the route guidance sentence of FIG. 14B, the third sentence and the fourth sentence are difficult for a user to understand. However, in the route guidance sentences of FIG. 14A, the expression "A junction" is changed as "T-crossing" and "Y-crossing" as declared expression of the junction pattern, and the expression is intuitively easy for the user to understand. Furthermore, in the route guidance sentences of FIG. 14B, expressions such as "Turn to the right, go forward by 10 meters, and go forward to the left by 30 meters" are used. However, in the route guidance sentence of FIG. 14A, this expression is changed to "Go forward along a crank by following the road." as an easy sentence in which the road pattern is briefly represented.

Furthermore, the ratio "P, Q" of road width in the road pattern parameter shown in FIG. 7 may be used for generation of the route guidance sentence by the route guidance sentence generation unit 7. For example, by using information of the ratio of road width, the unit guidance sentence such as "Go forward to a narrow road of the right side by 50 meters at Y-crossing." and "Go straight by 20 meters and turn to the right on a wide road at the end of T-crossing." can be generated. This unit route guidance sentence is easy for the pedestrian to understand.

As mentioned-above, in the present embodiment, the road pattern is macroscopically analyzed. As for the junction, information for a plurality of roads connected to the junction point is generated as the road pattern data. The area facing a plurality of roads connected to the junction is determined as the landmark selection area based on the road pattern data. The route guidance sentence is generated using the landmarks selected from the landmark selection area. Accordingly, easy route guidance sentences in which the landmark names are suitably used can be presented to the user.

Especially, in the present embodiment, the priority degree is respectively assigned to each landmark included in map data of the database 1. In the landmark selection area decision unit 5, as shown in FIG. 10, the priority degree is respectively assigned to a plurality of landmark selection areas. In the landmark selection unit 6, as shown in FIGS. 13A and 13B, based on the priority degree of the landmark selection area, the priority degree of the landmark included in the map data, and a distance from a route searched by the route search unit 3 to the landmark, the landmark included in the landmark selection area is suitably selected. Accordingly, an easy landmark can be selectively presented to the user.

In the landmark selection area decision unit 5, as shown in FIGS. 10, 11A, and 11B, at a part where the advance direction represented by the route data turns, the priority degree of the landmark selection area inside the turn toward the advance direction is set higher than the priority degree of other landmark selection areas. Accordingly, the landmark attracting the user's attention during walking is preferably used for the route guidance sentence.

Next, the generation processing of the simplified map at step S108 by the simplified map generation unit 8 is explained. In the database 1, a plurality of presentation patterns corresponding to various road pattern data obtained by the road pattern analysis unit 4 are previously stored in order to generate the simplified map. The presentation patterns are registered as bit map data or vector data in the simplified map database of the database 1, and used for representation of the simplified map. In case of generating the simplified map, first, the presentation pattern corresponding to the road pattern data generated by the road pattern analysis unit 4 is selected from the database 1. For example, if the analyzed road pattern is represented by the following parameters, a plurality of presentation patterns corresponding to the parameter is selected.

$$C(n, \theta_O, \theta_L, \theta_R, P, Q) = \{4, 75, 105, 65, 100, 140\}$$

After the plurality of presentation patterns is selected based on the route pattern (each junction, corner, and so on), they are connected along the guidance route. As a result, a simplified map from the departure point to the destination point along the guidance route is generated.

As mentioned-above, in the present invention, the road pattern such as the junction on the route from the departure point to the destination point is macroscopically analyzed, and the analysis result is reflected in selection of landmarks included in the route guidance information. The route guidance information such as a route guidance sentence is generated using the analysis result and the landmark. As a result, useless or diffuse expression in the route guidance information can be removed. Accordingly, the route guidance information is easy to intuitively understand.

A memory can be used to store instructions for performing the process described above. Such a memory can be a CD-ROM, floppy disk, hard disk, magnetic tape, semiconductor memory, and so on.

Other embodiment of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for generating route guidance information based on route information supplied from outside, comprising:

a storage unit configured to store road network data including a plurality of nodes and a plurality of arcs each connecting two nodes, and a plurality of expressions of route guidance in correspondence with a junction pattern and an advance direction of the junction pattern;

a road pattern analysis unit configured to analyze an angle difference between two roads each connected to a junction of the route information and a pattern of the junction by referring to the road network data;

a route guidance information generation unit configured to generate the route guidance information based on the expression of route guidance corresponding to a result of the analysis; and a presentation unit configured to present the route guidance information.

2. The apparatus according to claim 1, wherein node data of each node includes a node identifier, a node position, a node name, the number of arcs connecting the node, and an arrangement of arc identifiers connecting the node; and wherein arc data of each arc includes an arc identifier, positions of a starting point, and an end point of the art, an arc name, and an arc width.

3. A method for generating route guidance information based on route information supplied from the outside, comprising:

storing road network data including a plurality of nodes and a plurality of arcs each connecting two nodes, and a plurality of expressions of route guidance in correspondence with a junction pattern and an advance direction of the junction pattern;

analyzing an angle difference between two roads each connected to a junction of the route information and a pattern of the junction by referring to the road network data;

generating the route guidance information based on the expression of route guidance corresponding to the analysis result; and presenting the route guidance information.

4. The method according to claim 3, wherein node data of each node includes a node identifier, a node position, a node name, the number of arcs connecting the node, and an arrangement of arc identifiers connecting the node, and wherein arc data of each are includes an arc identifier, position of a starting point and an end point of the arc, an arc name, and an arc width.

* * * * *